United States Patent [19]

Freeman

[11] Patent Number: 4,594,476

[45] Date of Patent: Jun. 10, 1986

[54] BROADCAST INTERACTIVE TELEPHONE SYSTEM

[76] Inventor: Michael J. Freeman, 31 Cornwall La., Sands Point, N.Y. 11050

[21] Appl. No.: 646,295

[22] Filed: Aug. 31, 1984

[51] Int. Cl.$^4$ ............................................... H04M 1/64
[52] U.S. Cl. ................................. 179/6.08; 179/6.06; 179/6.11
[58] Field of Search .................... 179/6.04, 6.06, 6.08, 179/6.11, 6.17, 6.20; 358/84, 86; 364/521; 455/2, 3, 4; 434/308, 309, 310, 319, 321

[56] References Cited

U.S. PATENT DOCUMENTS

| | | | |
|---|---|---|---|
| 4,305,131 | 12/1981 | Best | 364/521 |
| 4,320,256 | 3/1982 | Freeman | 179/6.04 |
| 4,420,656 | 12/1983 | Freeman | 179/6.04 |

Primary Examiner—Donald McElheny, Jr.
Attorney, Agent, or Firm—Stiefel, Gross, Kurland & Pavane

[57] ABSTRACT

A verbally interactive broadcast type of telephone interrogation system (100) capable of simultaneously handling multiple callers over a two-way telephone subscriber network (102, 104, 106) to provide individualized interactive responses. A plurality of telephone boards (108, 110, 112) are connected in parallel to prerecorded data and deck address logic (114) to enable parallel processing of interactive telephone communications with the multiple callers, with one telephone board (108, 110, 112) being provided per incoming telephone line (102, 104, 106) to provide an unlimited number of potential interactive users for the system (100). The prerecorded data is stored by channel and level, with each level (150, 152, 154, 156, 158, 160) comprising, by way of example, four channels per multitrack tape deck (162, 164, 166, 168) with four decks (162, 164, 166, 168) being provided per level for a total of sixteen channels per level or ninety-six channels per telephone board (108, 110, 112). The correct channel and level is selected for an incoming call by a microcomputer (122) on the telephone board (108, 110, 112) and analog multiplexing (124) is used to select the particular channel in the ninety-six channels corresponding to the selected interactive message. Statistical and demographic caller data may also be stored (116, 118). The information is continuously rebroadcast over the ninety-six channels for interactive selection with the rebroadcast being independent of the next caller although what is heard by that caller is directly dependent on his/her selection.

31 Claims, 17 Drawing Figures

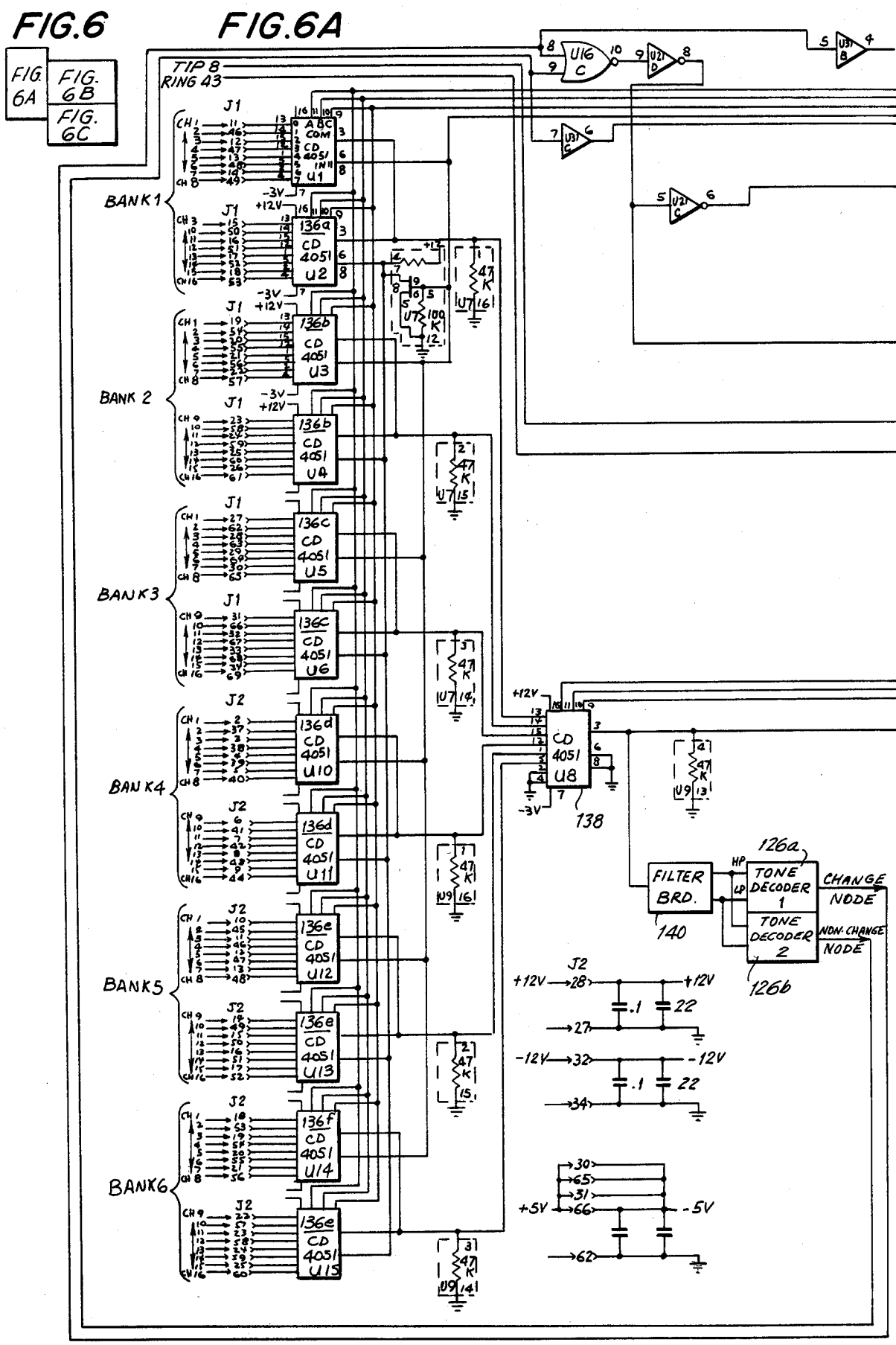

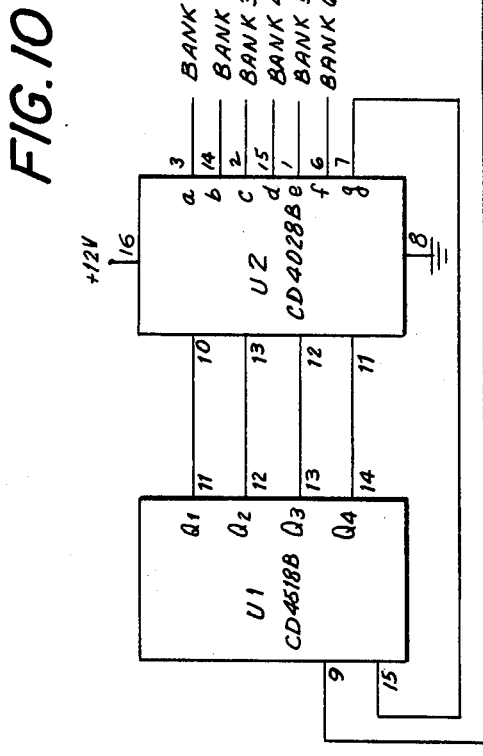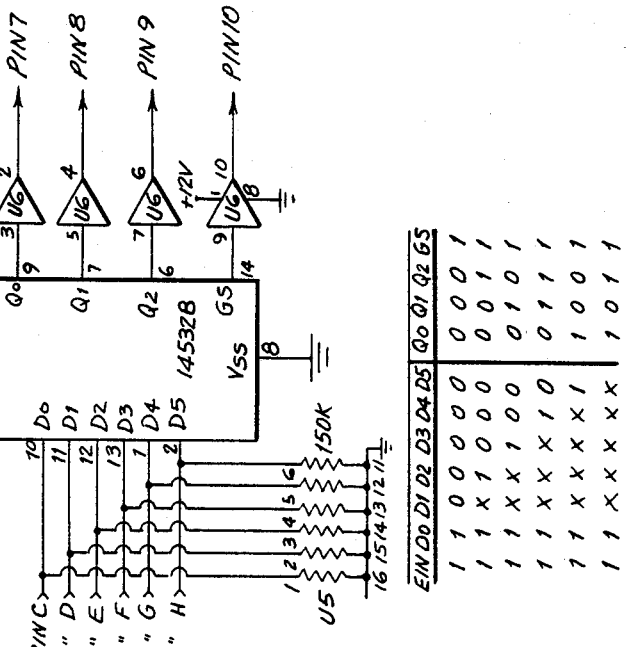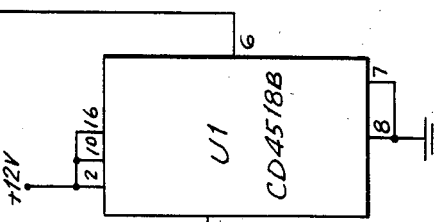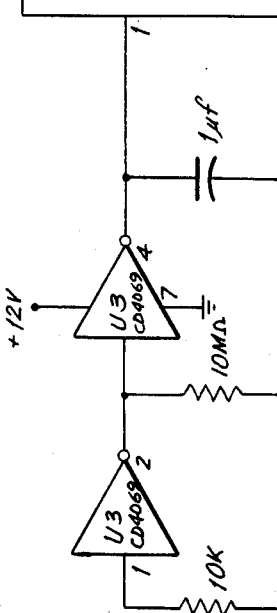
FIG.10

BROADCAST INTERACTIVE TELEPHONE SYSTEM

CROSS REFERENCE TO RELATED APPLICATIONS

This application is related to my U.S. Pat. Nos. 3,947,972; 4,078,316; 4,320,256; 4,264,924; and 4,264,925, as well as to my co-pending U.S. Patent applications Ser. No. 295,817, now U.S. Pat. No. 4,420,656, entitled "Interactive Telephone Answering System", filed Aug. 24, 1981, and Ser. No. 443,961, entitled "Interactive Telephone Answering Apparatus", filed Nov. 23, 1982, the contents of all which are specifically incorporated by reference herein in their entirety, and is a further improvement thereon.

TECHNICAL FIELD

The present invention relates to interactive telephone interrogation systems and particularly to multiple user systems in which a broadcast type of interactive telephone system is provided in which a plurality of subscribers may engage in substantially simultaneous interactive telephone communication.

BACKGROUND ART

Touch-Tone Telephone Systems are well-known and extend throughout the United States, as are other types of telephone systems such as the conventional rotary dial system, voice recognition systems and sound recognition systems. Such systems have been used for normal telephone conversations as well as in connection with interactive telephone interrogation systems such as described in my U.S. Pat. No. 4,320,256, by way of example. Although my prior patented systems have significantly improved the full utilization of the telephone system as a communications interface in a verbally interactive telephone interrogation system, such prior systems have suffered from certain limitations which are readily overcome by the present invention, such as cost and other factors relating to the capacity of the interrogation system. Thus, with the present invention it is believed that an unlimited number of interactive calls could be processed in an efficient manner with the only limitation being on the number of physical phone lines connected to the device. For example, a typical ninety-six channel system of the present invention could easily accommodate, by way of example, over 1,000 calls at any given time with each caller receiving his or her own individual interactive feedback with virtually no delay time at all. In addition, with the improved system of the present invention, complete memory and demographics could be provided on each call. By providing a broadcast type of telephone interactive system, the system does not care how many callers are listening. Thus, although interrogation systems or multiple choice student response systems are well-known, such as exemplified by the systems disclosed in U.S. Pat. Nos. 3,763,577; 3,774,316; 3,708,891; 3,623,238; 2,777,901; 3,194,895; 3,273,260; 3,484,950; 3,546,791; 3,947,972; 3,665,615; 3,245,157; 3,284,923; 3,538,621; 3,447,144; 4,078,316; 3,255,536; 4,264,925; 4,264,924; and 4,320,256, none of these prior art systems has the advantages of applicant's present invention. Similarly, although audience polling systems are well-known, such as disclosed in U.S. Pat. Nos. 2,674,512; 3,744,712; 3,776,453; 3,974,335 and 4,023,729, these prior art systems also lack the advantages of applicant's present invention. It should also be noted that the use of prerecorded telephone messages has been well-known for a considerable time, such as the weather or such as telephone answering machines. However, none of these prior art systems known to applicant is an individualized verbally interactive telephone interrogation system capable of handling multiple subscribers in the efficient manner of applicant's present invention. These disadvantages of the prior art are overcome by the present invention.

DISCLOSURE OF THE INVENTION

An improved verbally interactive telephone interrogation system for enabling a plurality of subscribers to engage in substantially simultaneous interactive telephone communication. The system comprises a two-way telephone subscriber network including a plurality of telephone caller means and a telephone message routing means operatively connected to the plurality of telephone caller means for selectively connecting individual ones of the plurality of telephone caller means to a remote message transmission means having an associated telephone number in response to provision of a unique dialing code from any of the telephone caller means corresponding to the associated telephone number. Each of the telephone caller means comprises a telephone reception means for receiving audio messages over the two-way telephone subscriber network and signal generator means for selectively providing the unique signal outputs to be transmitted over the two-way telephone subscriber network. The two-way subscriber network comprises a plurality of incoming telephone lines to the remote transmission message means. The improved system includes storage means such as a multitrack tape arrangement comprising a plurality of multitrack tape decks, capable of retrievably storing a plurality of parallel retrievable channel sets or levels of interactive audio information having substantially the same audio information content and duration. The parallel channel sets of retrievable audio information are simultaneously broadcast with each parallel channel set audio information content having a message initiation time and a message termination time and with each of the channel message initiation times and termination times being staggered in real time with respect to each other. Each of the channel sets comprises a plurality of interactively related channels of audio information responsive to individual interactive selection by a caller connected thereto via the two-way subscriber network. An activation signal, such as the first incoming call, initiates cyclical simultaneous rebroadcast of the staggered parallel channel sets audio information independent of subsequent caller selection of the information. Independent interactive parallel processing of multiple subscriber calls to the associated telephone numbers is provided whereby each caller contacting the associated telephone number may independently interact with the audio information in a given channel set for providing an individualized, interactive message response over the two-way subscriber network via the subscriber signal generator to the storage means and receive an individualized interactive audio response in response thereto directly dependent on the caller individual selection for providing an individualized interactive communication, with the interactivity being independent of the number of callers. The multitrack storage means further comprises a message selection maze comprising multiple levels and multiple channels with the level, with each level having staggered message initiation times whereby the aforementioned plurality of subscribers may engage in substantially simultaneous interactive telephone communication. The parallel processing means comprises individual telephone boards for each of the incoming lines which include a microprocessor for selecting the next available interactive audio information message from the plurality of simultaneous rebroadcast parallel channel audio information in response to the unique dialing code. In accordance with the broadcast concept of the present invention wherein the outgoing messages are always available and independent of the number of callers, the system configuration enables the number of telephone lines to be increased by merely adding appropriate telephone boards. In addition, a memory is provided for storing caller demographics and other information on each caller, such as order information by way of example, enabling the owner of the system to determine things such as up-to-date inventory demands, number of incoming calls, etc. in addition to providing various ways of despooling information from the incoming subscriber. In this regard, the system of the present invention may collect caller information even if the information does not require a system response. It should be noted that the system of the present invention may readily interact with callers using rotary or pulse dial phones or any other conventional communication mode via telephone and provide an interactive response in a natural voice and sound as opposed to a voice synthesized type of response. For example, in processing the clicks from rotary or pulse dial or Touch-Tone phones, the clicks may be detected and counted by use of an AGC circuit, level detector and counter, with a transmit-listen gate and quartizing being employed to improve the detection. In such an instance, the transmit-listen gate would keep outgoing data from affecting the click counter, whereas quartizing the responses would prevent click count errors without causing an error or interpretation of the count due to noise. Thus, in accordance with the present invention, a flexible system is provided in which interactive information will be continuously rebroadcast after initiation as long as at least one caller is accessing the system over the multiple channels, such as ninety-six channels by way of example, to be available for interactive selection by individual callers, with the rebroadcast of this information being independent of any subsequent caller whereas what is heard by any subsequent caller is directly dependent on his or her selection.

BRIEF DESCRIPTION OF THE DRAWINGS

FIG. 10 is a logic block diagram of the deck address logic portion of the system of FIG. 1;

BEST MODE FOR CARRYING OUT THE INVENTION

Figure 1:
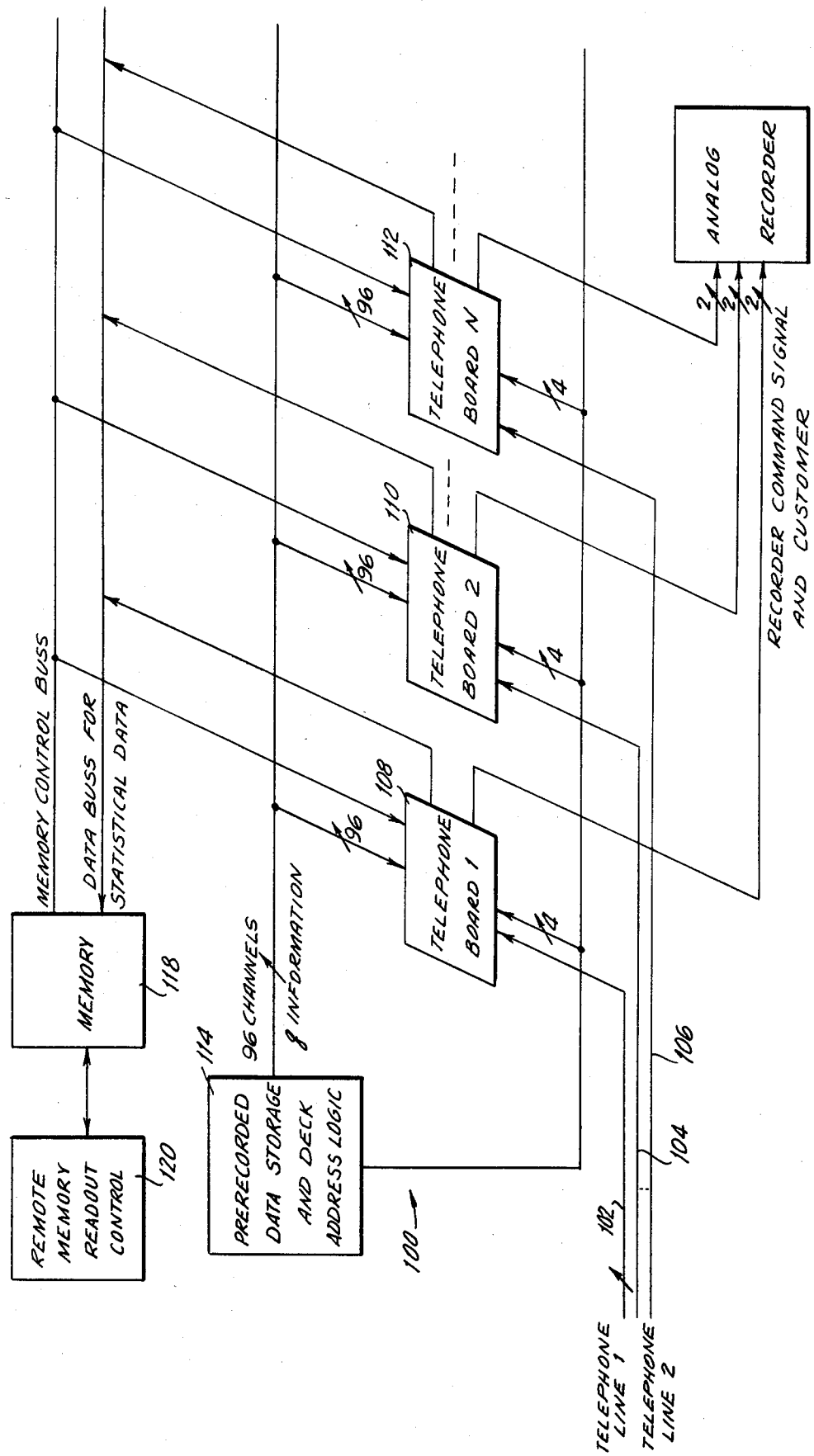
FIG. 1 is an overall functional system block diagram of the system of the present invention.

Referring now to the drawings in detail and initially to FIG. 1, an overall system block diagram of the presently preferred improved interactive telephone interrogation system of the present invention, generally referred to by the reference numeral 100, is shown. As shown and preferred in FIG. 1 the system 100 provides parallel processing for an unlimited number of interactive calls. In this regard "N" number of telephone lines represented by reference numbers 102, 104 and 106 are shown. Each of the incoming telephone lines is preferably associated with a telephone board circuit 108, 110, and 112, respectively, with a typical such telephone board circuit 108 to be described in greater detail hereinafter with reference to FIGS. 3, 4, 6, 7, 8 and 9, and with the number of telephone lines being increased merely by adding appropriate telephone boards as illustrated in FIG. 1. In addition, the system 100 of the present invention includes prerecorded data storage and deck address logic, generally referred to by the reference numeral 114, and described in greater detail hereinafter with reference to FIGS. 2, 5 and 10 through 12. Lastly, the system 100 of the present invention also preferably includes a conventional analog recorder 116 for recording subscriber information such as names and addresses, and a conventional memory 118 for recording demographic or statistical data, such as caller statistics, as well as a conventional remote memory readout control 120 for enabling readout of the statistical data stored in the memory 118, such as for later analysis if desired. As is shown and preferred in FIG. 1, each of the telephone boards 108, 110 and 112, is preferably connected in parallel to the prerecorded data storage and deck address logic 114, to the analog recorder 116, and to the memory 118.

Figure 6B:
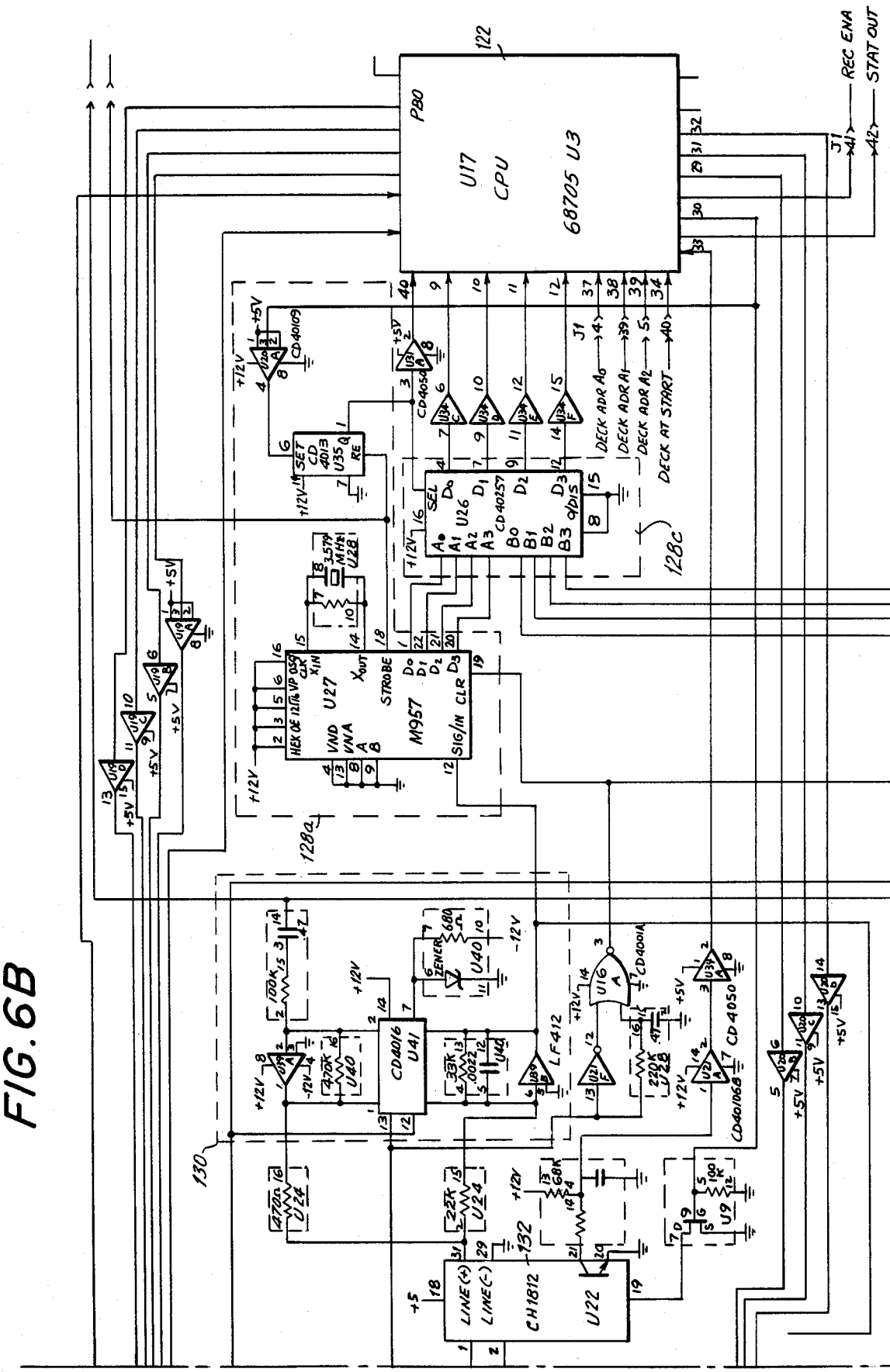
FIG. 6 which comprises FIGS. 6A, 6B and 6C assembled in the manner illustrated, is a partial schematic diagram of the telephone board logic of the typical telephone board illustrated in FIG. 3.
Figure 6C:
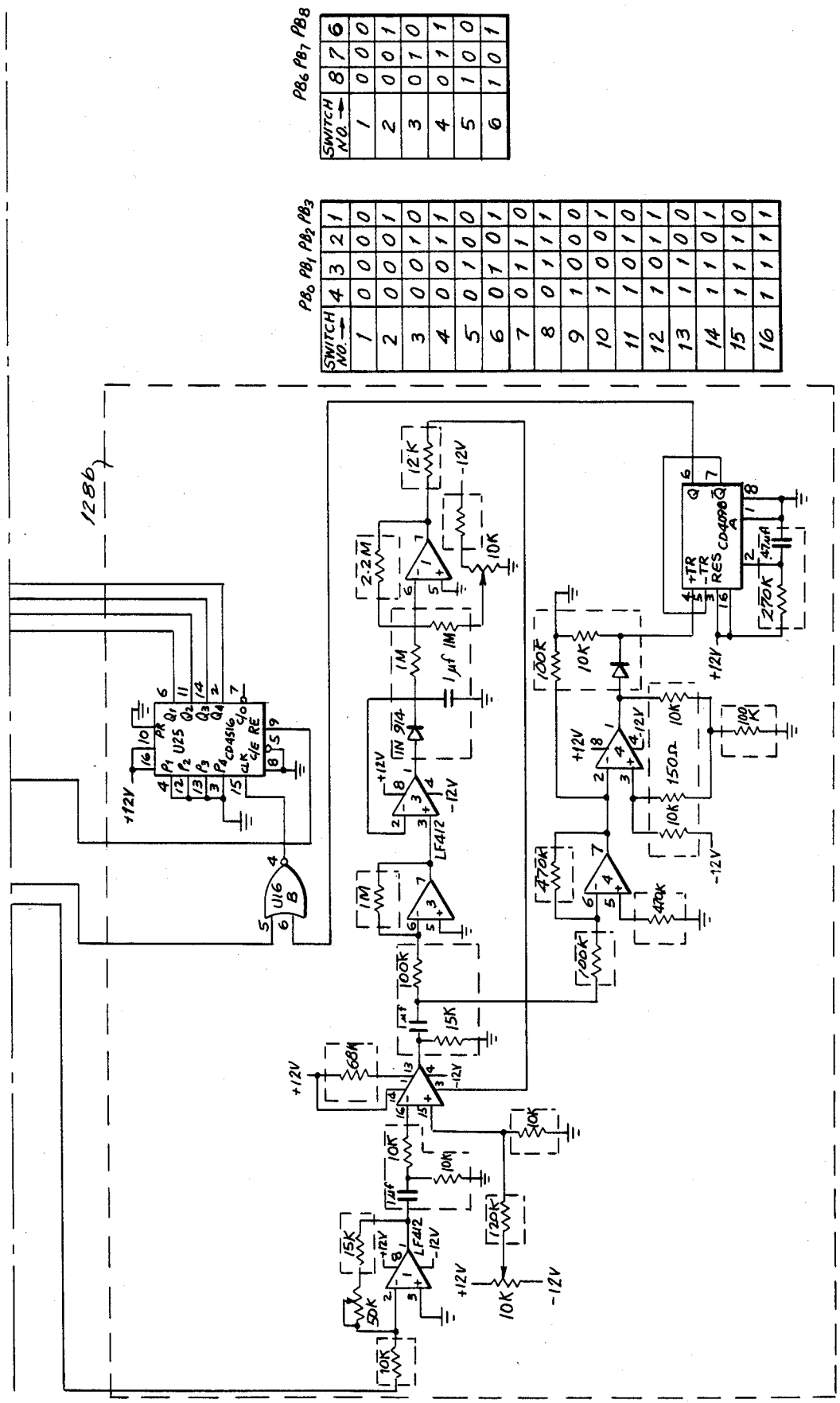

Referring now to FIGS. 3, 4, and 6 through 9, a typical telephone board circuit 108 shall now be described in greater detail. As shown and preferred, by way of example, a typical telephone board 108 is capable of handling ninety-six channels using six levels with sixteen channels per level. This arrangement of channels and levels will be described in greater detail hereinafter with reference to FIGS. 2 and 13, by way of example, which are directed to the prerecorded data storage portion of circuit 114. As shown and preferred in FIG. 3, by way of example, a typical telephone board 108 preferably includes a conventional microcomputer 122, such as the typical CPU chip designated MC68705U3 in FIG. 6. As will be described in greater detail hereinafter, the microcomputer 122 is at the heart of the operation of the telephone board 108 in providing a broadcast interactive telephone system. The system 100 is based on the next available interactive message set selection for the next incoming multiple subscriber. This is accomplished by interactive continuously rebroadcasting the interactive information after it is initiated over the plurality of available channels, which are ninety-six channels in the above example, so long as at least one caller is accessing the system 100 with the rebroadcast being, thereafter, independent of the caller selection whereas what is heard by any subsequent caller or subscriber is directly dependent on his or her selection. In this regard, a conventional analog multiplexer 124, shown in block form in FIG. 4 by way of example is operatively connected to the microcomputer 122 and the prerecorded data storage network 114 for providing analog multiplexer selection of channel based on the telephone caller input to the microcomputer 122 for the telephone line associated with the telephone board which, in the example of telephone board 108 is telephone line 102. The level selection is based on when the call is received by the system 100 and also which message set or level is about to start from the beginning of its complete interactive message. Telephone board 108 also includes tone decoder and combinational logic 126 to be described in greater detail hereinafter with reference to FIGS. 7 and 8, which is operatively connected to the microcomputer 122 and the analog multiplexer 124, dial decoders 128a, 128b, which are schematically shown in FIG. 6 and which are operatively connected to the microcomputer 122 and to a conventional talk/listen switch 130. The talk/listen switch 130 is operatively connected to the microcomputer 122 and to a conventional telephone interface 132 which interfaces with the conventional tip and ring circuit and the microcomputer 122. The microcomputer 122 is also operatively connected to the analog tape recorder 116 to provide a tape control signal to initiate recording caller information such as name, address and other information as may be stored in the microcomputer. Information which may be used to identify the particular track which may be heard by the caller is mixed with computer data and caller voice in a conventional summing circuit 134. As shown and preferred in FIG. 4, the analog multiplexer 124 in the preferred system of 100 the present invention wherein sixteen channels, by way of example, are employed at each of six levels, a separate conventional analog gate 136a, 136b, 136c, 136d, 136e, and 136f is shown associated with each of the six levels or message sets. Each of the conventional analog gates 136a through 136f, inclusive, are preferably capable of selecting one of sixteen signal paths, in the above example, in response to a channel address signal from the microcomputer 122 and associated logic 126, with the outputs of these conventional analog gates 136a through 136f, inclusive, preferably being provided in parallel as inputs to another conventional analog gate 138 which also preferably selects one of the six inputs, this time dependent on a level address signal received from the microcomputer 122 and associated logic 126. This final output signal from analog gate 138 represents the interactive prerecorded information stored in the prerecorded data storage network 114 illustrated in FIG. 2, with the channel and level address as determined by microcomputer 122, with this output information being provided to the talk/listen switch 130 and back through the telephone interface 132 to the associated telephone line 102 and back to the subscriber to provide the interactive telephone communication with the caller. The analog multiplexer 124 is shown in schematic in FIG. 6 with analog gates 136a through 136f, inclusive, each shown as comprising two conventional 4051 logic gates each of which is capable of making a oneoutofeight selection, and with the six outputs of these analog gate pairs 136a through 136f being provided to another conventional 4051 analog gate 138. The balance of the circuitry illustrated in FIG. 6 is conventional logic circuitry operatively connected in the manner illustrated in the functional block diagram of FIG. 3 with the requisite conventional supporting logic circuitry also being illustrated in the schematic of FIG. 6. By way of example, typical circuit values are provided on the logic schematic of FIG. 6 along with the applicable logic truth tables relating to the selection of the appropriate interactive message communication in accordance with the analog multiplexer selection of the channel of which there are preferably sixteen by way of example for a given level, and of the level or bank of which there are six, by way of example, in the above example of ninety-six channels provided in the presently preferred system 100 of the present invention. First, as illustrated in the example of FIG. 6, there are sixteen channels per level, and there are four decks per level, as can be seen by reference to FIG. 2 and as will be described in greater detail hereinafter, and four channels per deck in the presently preferred system 100 of the present invention. The corresponding portions of the logic schematic of FIG. 6 which correspond to the functional blocks in FIG. 3 have been labeled with the same reference numeral, namely talk/listen switch 130, dial decoders 128a, 128b, 128c, telephone interface 132 and the aforementioned microcomputer 122 and analog multiplexer 124 represented by the analog gate 136a through 136f, inclusive, and 138. The dial decoders 128a, 128b, 128c are comprised of three major subsystems; the Touch-Tone decoder 128a in FIG. 6, the rotary and Touch pulse decoder 128b of FIG. 6 and the digital multiplexer 128c of FIG. 6. The Touch-Tone decoder, 128a is a conventional Touch-Tone decoder which is by way of example an M957.

The rotary or Touch pulse 128b preferably employs a conventional AGC circuit 129, level detector 131 and counter 133 to determine the number of times the customer's or caller's telephone generated a click during the dialing process when a selection is being made, with the number of clicks being directly related to the number dialed by the caller. The output of the click counter 133 with the output of Touch-Tone decoder 128a is preferaly fed to digital multiplexer 128c which is used to select which decoder 128a or 128b is appropriate for the telephone type being used by the customer making the incoming call, with the output of multiplexer 128c being an input to the microcomputer 122. The AGC circuit 129 time constants are preferably optimized to extract the click waveforms from background noise. Further signal processing for click detection is achieved by use of the talk/listen switch 130 is preferably set to listen to tones on the outgoing message tape and detected by filters 140, illustrated in greater detail in FIG. 9, and tone detectors 126a, 126b. The tones that operate talk/listen switch 130 are preferably placed on the outgoing message tape with timing such that the switch 130 is set to listen when a customer response is desired. By being set to listen, the outgoing message signal is prevented from reaching the click counter 133, therefore reducing the possibility of false click signals. False click signals are further reduced by algorithims in the micro-computer 122 which selects the most likely response if there is ambiguity in the click count and further reduced by requesting particular customer responses which are easily recognized. By example, if the choices for the customer were 1,4 or 7 then 1,2 or 3 clicks would be recognized as 1; 4,5,6 clicks would be understood to be a 4; and more than 7 clicks would be recognized as a 7. This technique greatly reduces the possibility of error because a click counter 133 error would always be in the direction of extra, rather than fewer clicks.

Figure 7:
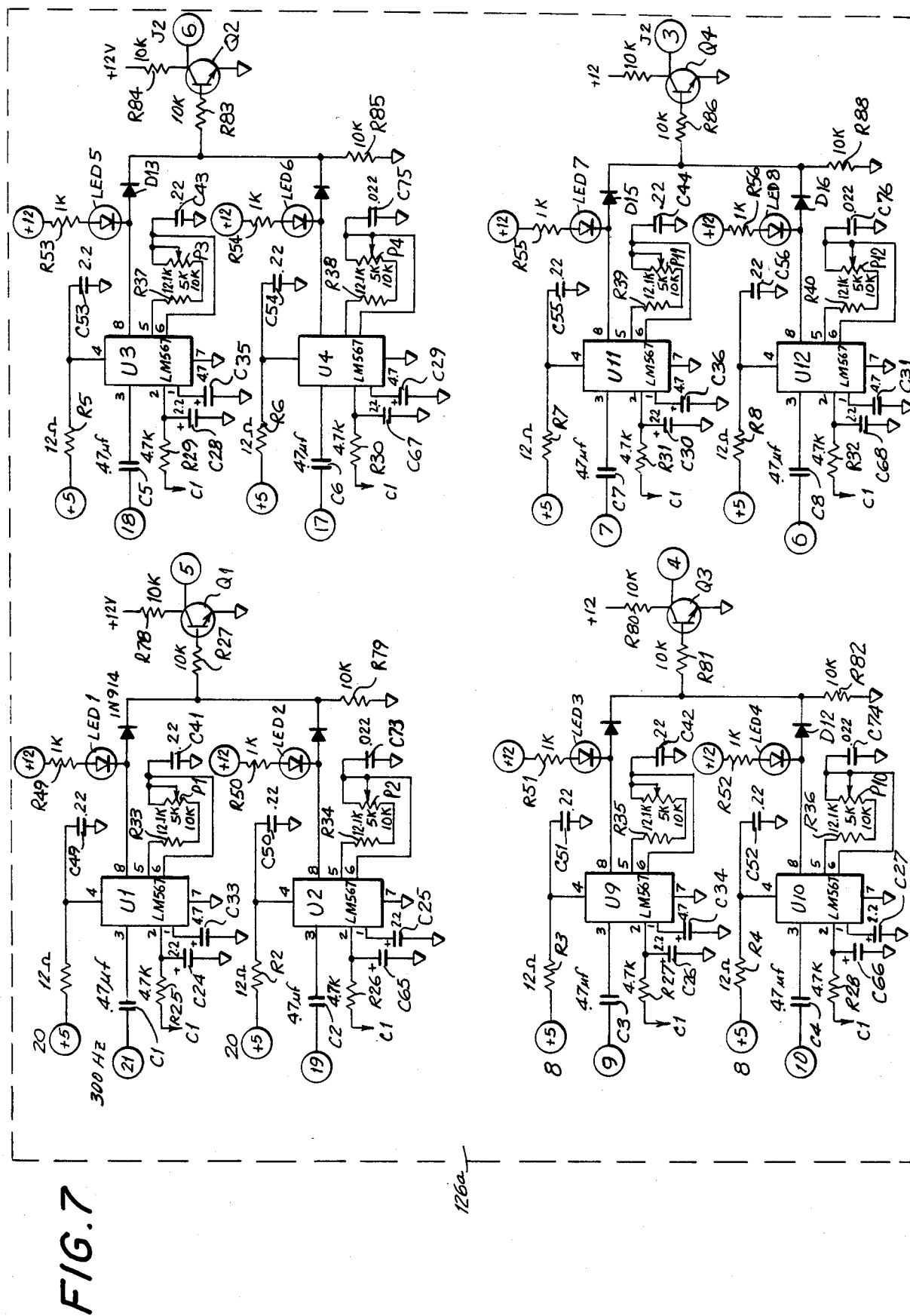
FIGS. 7 and 8 comprise a partial diagram of the tone decoder portion of the telephone board logic of FIG. 6.
Figure 8:
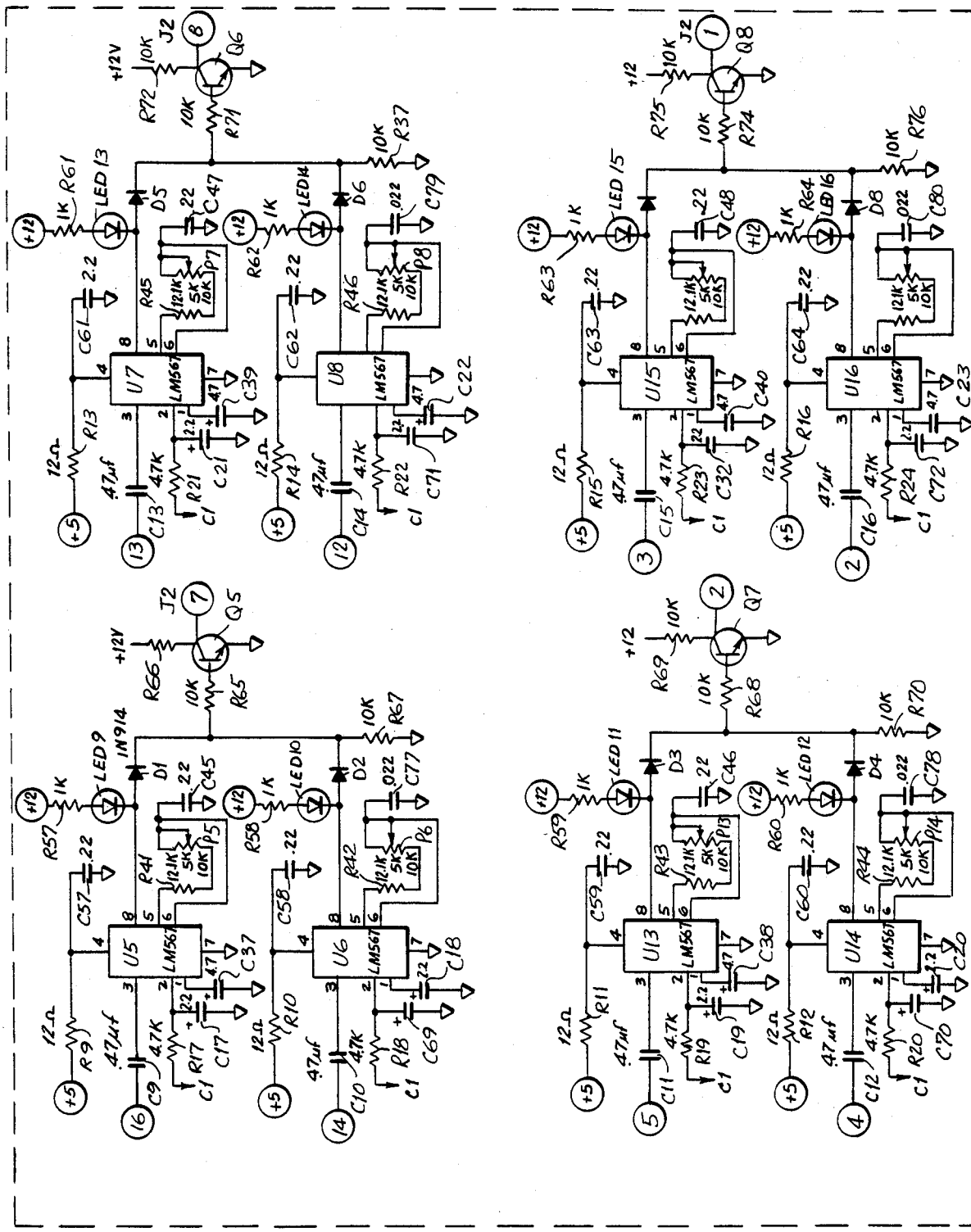
Figure 9:
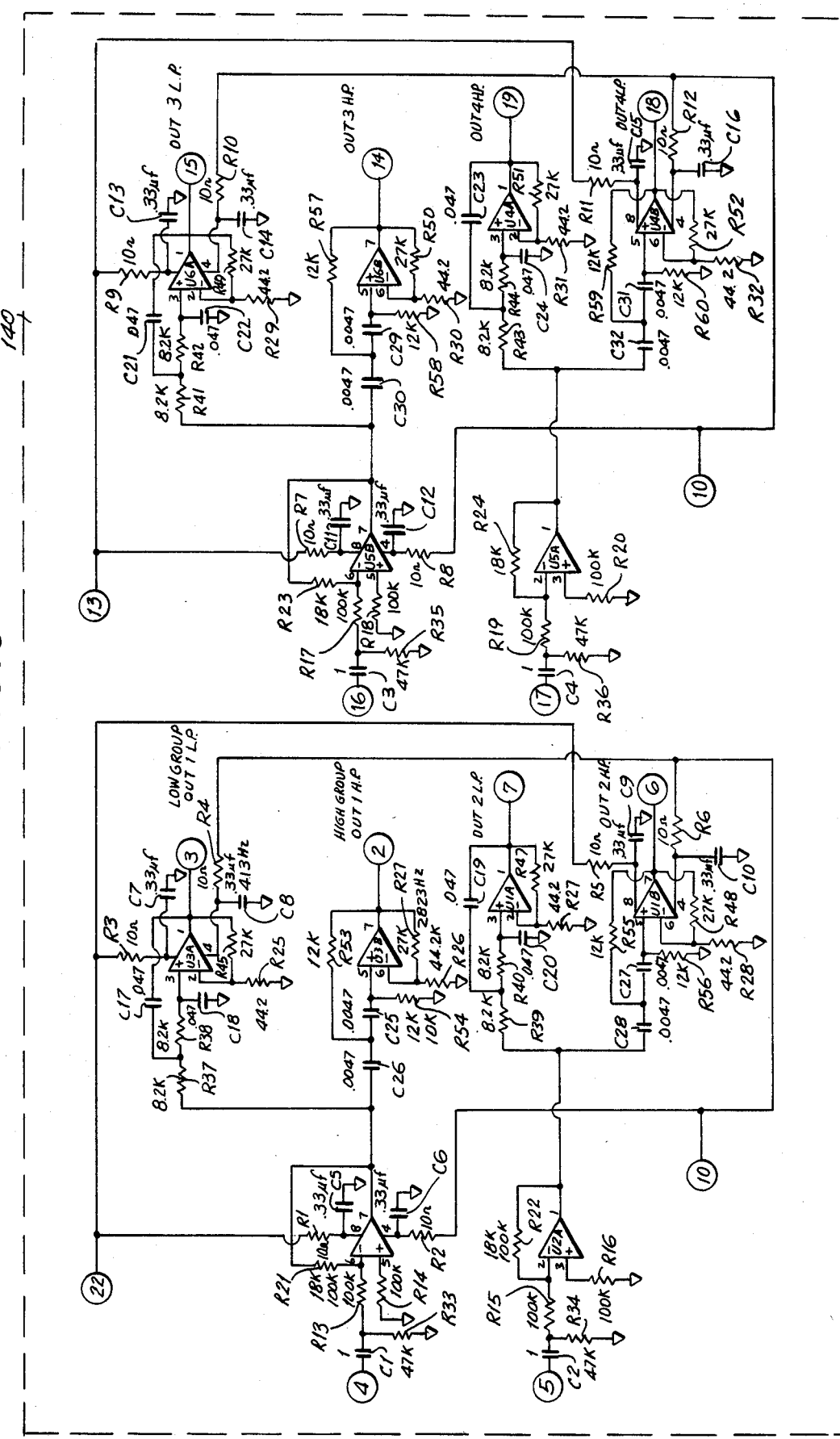
FIG. 9 is a partial schematic diagram of the filter board portion of the telephone board logic of FIG. 6.

As previously mentioned the tone decoders 126a and 126b are only shown in block representation in FIG. 6 although they are shown in greater detail in FIGS. 7 and 8. As further shown and preferred in FIG. 6, each typical telephone board 108 preferably also includes the previously mentioned filter board 140. It is believed that with the illustrative circuit values provided on FIG. 6 as well as the illustrative component identification, that no further explanation is necessary for a person of ordinary skill in the art to understand the operation of the typical telephone board circuit 108. In this regard, the tone decoders 126a and 126b illustrated in FIG. 6 are conventional tone decoder which pairs are illustrated in greater detail in the logic schematics of FIGS. 7 or 8. One pair of tone decoders, for example, pair 126a, is used to detect a tone pair that may initiate a change of outgoing message and the other pair detect a tone pair that initiates receipt of strictly demographics data that does not change the outgoing message content. As is shown and preferred in FIGS. 7 and 8, the tone decoder circuits 126a and 126b, in reality, preferably comprise a plurality of conventional tone decoders for conventionally decoding the control signals provided from the outgoing message tapes, with each individual tone decoder being, by way of example, a conventional LM567 decoder having appropriate conventional associated circuitry such as illustrated in FIGS. 7 and 8. Other tone decoder pairs decode tone pairs to, for example, initiate operation of the analog recorder 116 via the microcomputer 122 and synchronize operation of each of the four decks in each level. FIGS. 7 and 8 represent, by way of example, eight pair of tone decoders, with four tone decoder pairs being located in the telephone board 108, by way of example, and four tone decoder pairs being located to operate with the various decks for synchronization tasks. For purposes of completeness, typical circuit values for these conventional tone decoders are provided in FIGS. 7 and 8 and it is believed that no further explanation is necessary for a person of ordinary skill in the art to understand the operation of these conventional tone decoders in the telephone board logic 108 of FIG. 6 or as inputs to the solenoid logic of FIG. 11. Suffice it to say that the tone decoder 126 detects signals received from the outgoing message tape and provides information to the processing circuitry comprising the microcomputer 122. In this regard, as was previously mentioned with reference to FIG. 6, a conventional filter circuit arrangement 140, such as illustrated in schematic detail in FIG. 9, is preferably conventionally employed together with the tone decoders 126a and 126b. Again, typical circuit values appear in the logic schematic diagram of FIG. 9 which should be readily understandable to one of ordinary skill in the art without further explanation.

Figure 2:
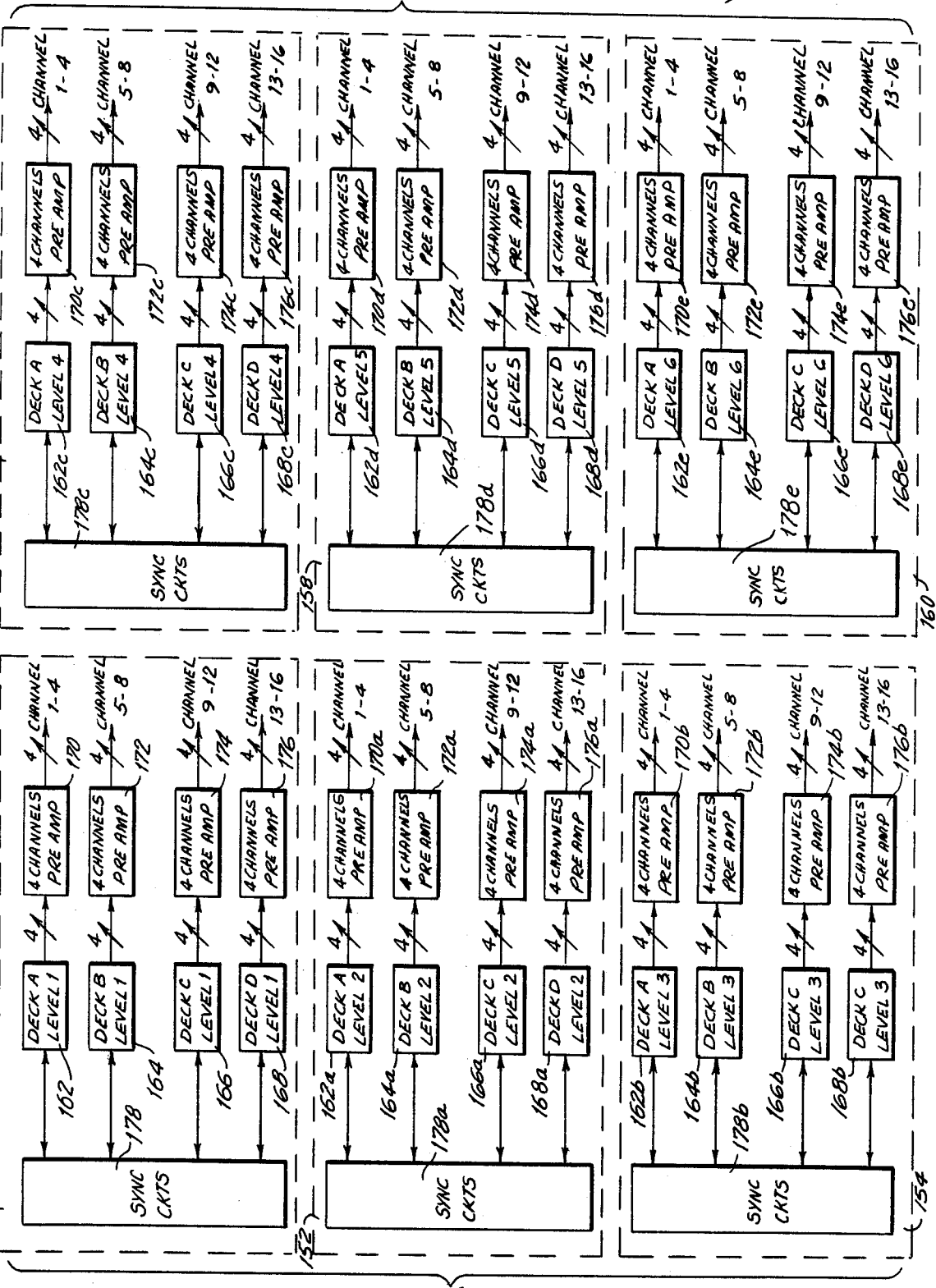
FIG. 2 is a functional system block diagram of the prerecorded data storage portion of the system of FIG. 1.
Figure 3:
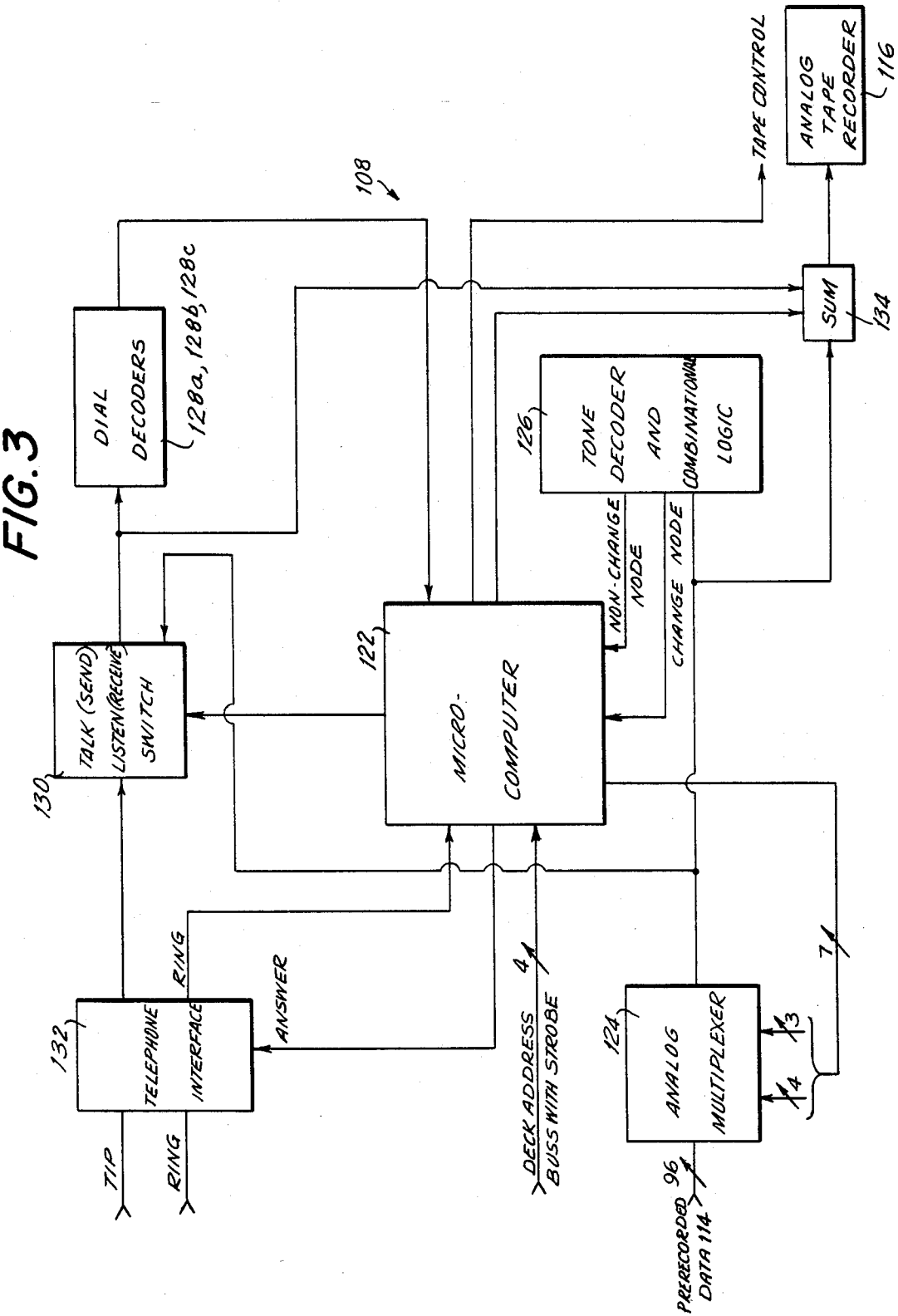
FIG. 3 is a functional system block diagram of a typical telephone board in the system of FIG. 1.
Figure 4:
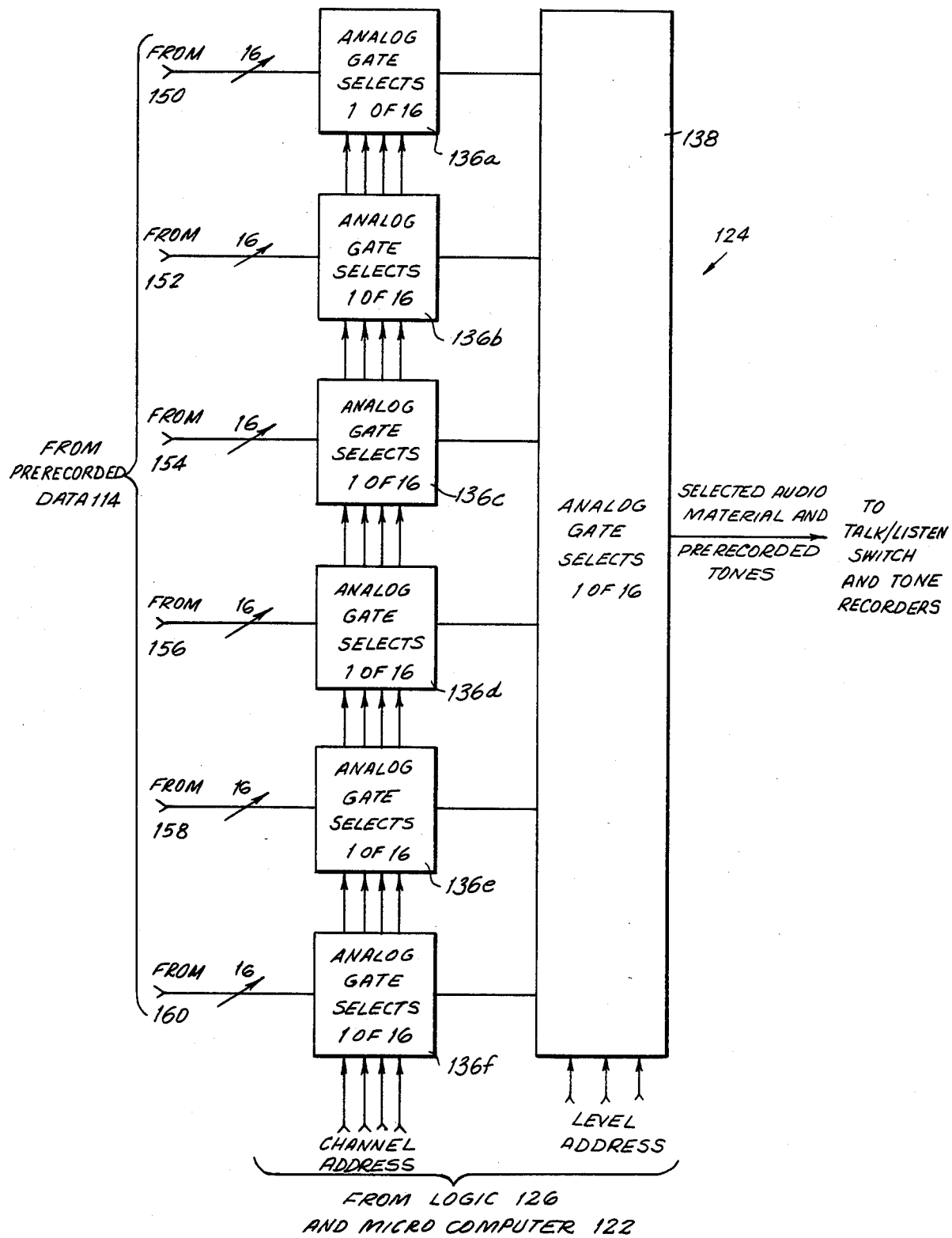
FIG. 4 is a functional block diagram of the analog multiplexer in the telephone board of FIG. 3.
Figure 5:
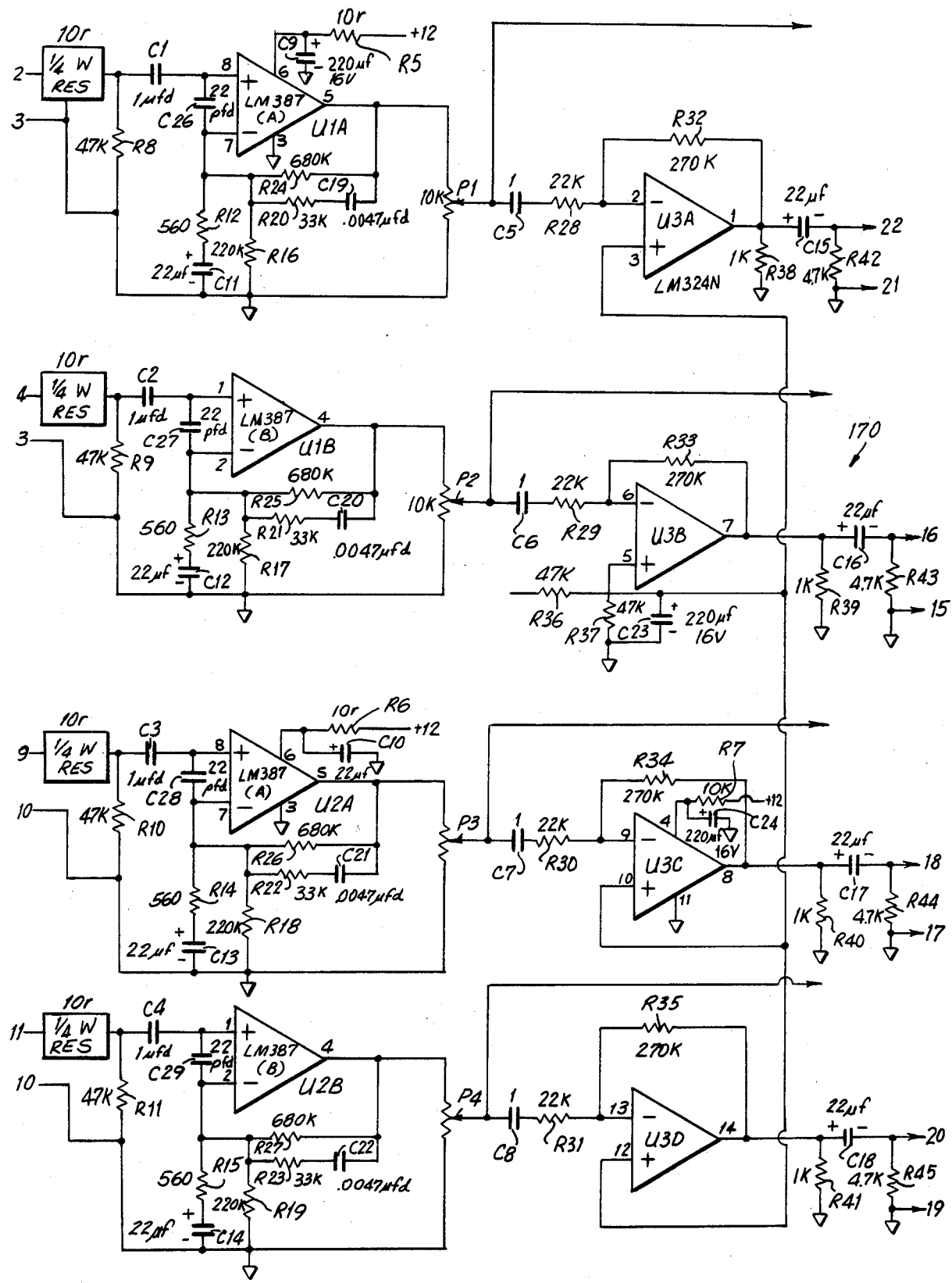
FIG. 5 is a partial schematic of a typical preamplifier portion of the prerecorded data storage arrangement shown in FIG. 2.

Referring now to FIG. 2, the prerecorded data storage portion of functional block 114 of FIG. 1 is shown in greater detail. As was previously mentioned with reference to FIG. 6, FIG. 2 illustrates the six levels 150, 152, 154, 156, 158 and 160, by way of example, used in the presently preferred system 100 of the present invention, by way of example, to provide the illustrated ninety-six channels, with each level comprising sixteen channels. As is illustrated in FIG. 2, each of the six levels 150 through 160, inclusive, is preferably functionally the same. As such, one such typical level, level 150 shall be described by way of example. With respect to level 150, as is shown and preferred by way of example, in FIG. 2, the level consists of four conventional tape decks, 162, 164, 166 and 168, each of which is a conventional four channel multitrack tape deck. Of course, if desired more than four channels per deck would be employed without departing from the present invention. In the above example, the output of each of the multichannel or multitrack tape decks 162 through 168 are four distinct channels of information which are each, respectively, provided to a conventional four channel preamplifier 170, 172, 174 and 176, respectively, shown in greater detail in FIG. 5. In the example shown in FIG. 2, for level 1, deck 162 and preamplifier 170 are associated with channels 1 to 4 of the sixteen channels, deck 164 and preamplifier 172 are associated with channels 5 to 8 of the sixteen channels, deck 166 and preamplifier 174 are associated with channels 9 through 12 of the sixteen channels, and deck 168 and preamplifier 176 are associated with channels 13 through 16 of the sixteen channels. In addition, as shown and preferred, conventional sync circuitry 178 is provided for each of the decks 162 through 168 inclusive, to ensure that all tapes start at the same time, with the prerecorded information being prerecorded on multitrack magnetic tape. Preferably, the prerecorded information contained in decks 162–168 are synchronized to operate as a single sixteen channel playback deck which is termed "a level". Likewise, decks 162a–168a, 162b–168b, 162c–168c, 162d–168d and 162e–168e preferaly operate as separate sixteen channel decks or levels. As was previously mentioned, in the above example there are a total of six such levels for the configuration illustrated in FIGS. 1–14. Each of the six levels or message sets are preferably staggered in time by the sync circuitry 178 and the circuitry of FIG. 10 so that the waiting time for a new caller does not exceed the outgoing message length divided by six in the above example of six levels. By way of example, a two minute outgoing message with a six level configuration, as illustrated herein, gives a maximum waiting time of 20 seconds. Furthermore, in the above example, the use of, for example, three possible start messages at the beginning of the outgoing message, each start message having the same basic information further reduces the waiting time by a factor of three. For the example above, this technique of using two alternate start messages gives a maximum waiting time of approximately seven seconds. Of course, the number of start messages, levels and length of messages are variables which can be arranged to further reduce the waiting time.

With respect to the start of the various tape decks illustrated in the example of FIG. 2 which comprise the prerecorded data storage portion 114 of the system 100, there are 24 illustrated separate multitrack decks, with each set of such decks comprising a level, with the tape start for the interactive branching of the information and a cyclical entire system occurring when the first caller accesses the system. Thereafter, the audio information is continuously rebroadcast over the ninety-six channels in the above example to be available for interactive selection by subsequent callers. It should be noted that this rebroadcast is independent of any caller after the system has been initiated whereas what is heard by any subsequent caller is directly dependent on his or her selection as will be described in greater detail hereinafter with reference to the example of FIGS. 13 and 14. Of course, if desired, instead of four separate four channel tape decks, a conventional sixteen channel tape deck may be employed without departing from the spirit and scope of the present invention. Furthermore, other mass storage means such as video discs, by way of example, may be employed to reduce the total number of playback devices without departing from the spirit or scope of the present invention.

It should be noted that the output of the various preamplifiers 170 through 176, by way of example, is provided in parallel to the analog multiplexer 124 for selection of the appropriate channel and level by the logic 126 and microcomputer 122. This can be seen further with reference to FIG. 4 which was previously described. Since the functioning of the various components for levels 152, 154, 156, 158 and 160 is identical to that for level 150 previously described, like reference numerals are being employed followed by the letter a for level 152, followed by the letter b for level 154, followed by the letter c for level 156, followed by the letter d for level 158, and followed by the letter e for level 160. With respect to the typical preamplifier circuits 170 through 176, by way of example, a typical such preamplifier circuit is shown by way of example in FIG. 5 which is a detailed partial schematic. As was true with respect to previous figures herein, typical circuit values are provided on the schematic along with component identification which is believed to be sufficient for a person of ordinary skill in the art to readily understand the function and operation of the conventional preamplifier circuit 170 through 176 inclusive without further explanation.

Figure 11:
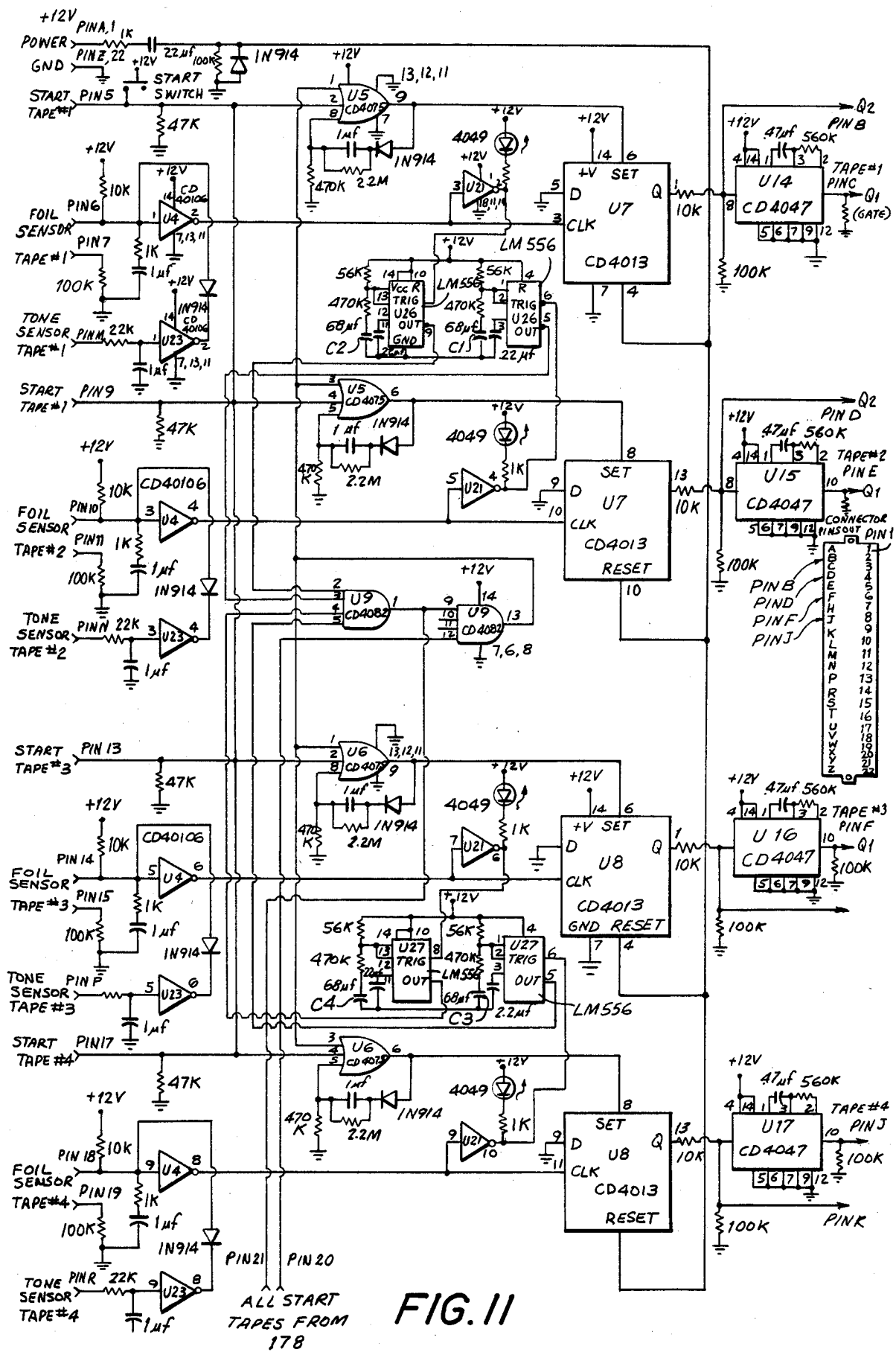
FIG. 11 is a logic block diagram, partially in schematic, of the deck solenoid logic control of the system of FIG. 1.
Figure 12:
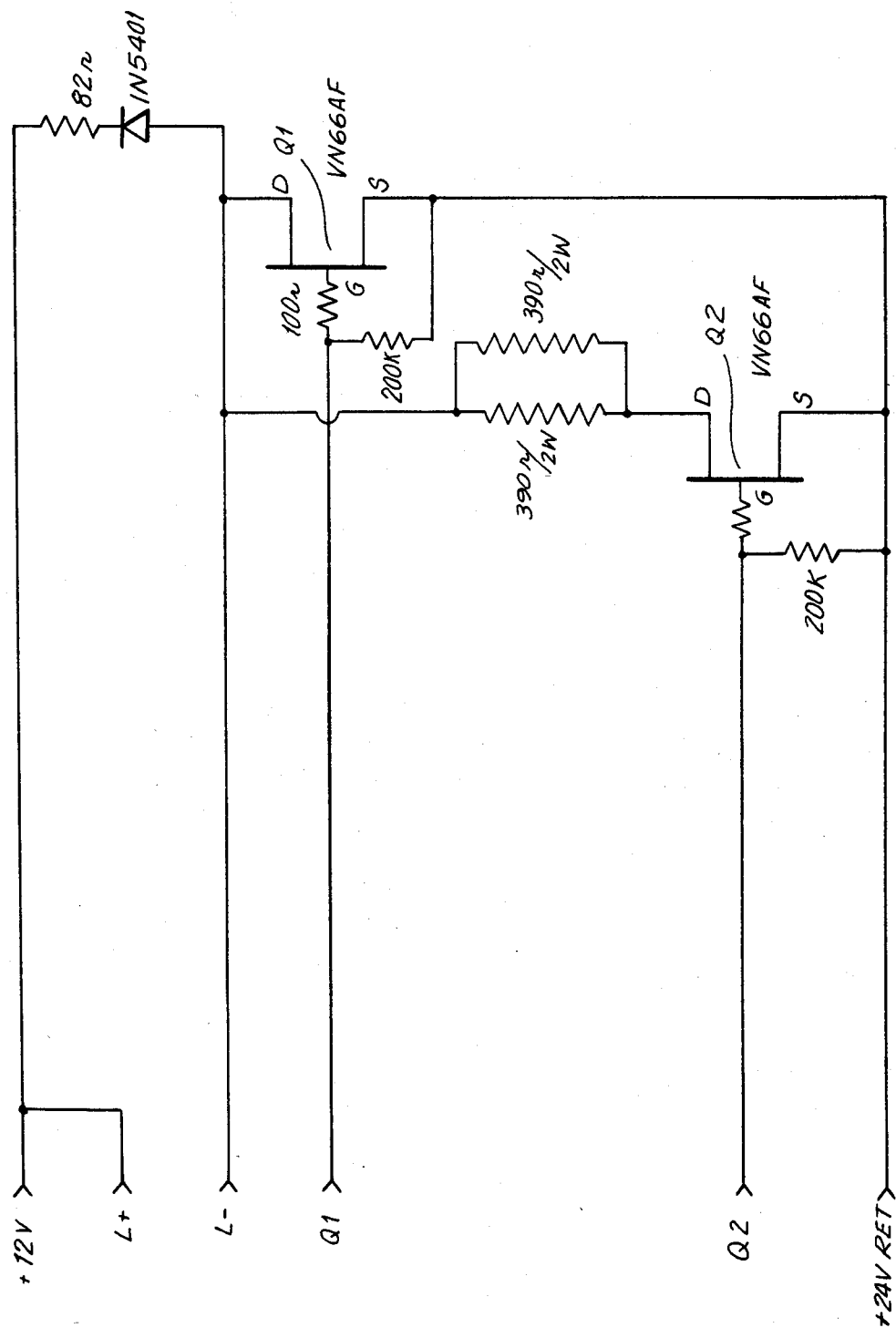
FIG. 12 is a schematic diagram of a typical solenoid drive circuit for the decks of the system of FIG. 1.

Referring now to FIGS. 10 through 12, the deck address logic and solenoid drive control for controlling the conventional multitrack tape decks employed in the prerecorded data storage portion 114 of the present invention 100 illustrated in FIG. 2 is shown in greater detail.

Referring now to FIG. 10, FIG. 10 is a logic schematic of the deck address logic portion of block 114 in FIG. 1. As shown and preferred in FIG. 10, the deck address logic consists of bank or level selective switches which are logic switches which function preferably in accordance with the truth tables illustrated in FIG. 10. The various pin numbers correspond to the associated pin numbers in FIG. 6 and it is believed that a person of ordinary skill in the art together with the truth tables and the circuitry illustrated herein, including the typical circuit components identified in FIG. 10, will readily understand the operation of the bank selective switching circuit without further explanation. As is shown and preferred in FIG. 10, suffice it to say, that the output of the CD4028B conventional logic circuit is the six different level signals for level or banks 1, 2, 3, 4, 5 and 6 which, together with the channel address signals, comprise the selection signal for the appropriate deck and channel at the appropriate level 150 through 160, inclusive.

Referring now to FIG. 11, a logic schematic diagram of a typical solenoid logic control circuit, generally referred to by the reference numeral 200, for a typical deck, such as deck 162, is shown. As is shown and preferred in FIG. 11, a synchronizing signal from the sync circuit 178 is provided to the deck address motor drive control logic 200 to ensure that each of the various decks in the system 100 is synchronized. In this regard, a foil sensor is preferably mounted on each tape track, along with a tone sensor so that each of the four tapes or tracks in the deck 162 are maintained in synchronism. In order to accomplish this, the conventional logic circuit illustrated in FIG. 11 utilizes these sensed signals to stop the tape then restart them again to assure a synchronized condition. The various components of the conventional logic circuit of FIG. 11 are labeled with typical circuit values along with typical components and will be readily understood to a person of ordinary skill in the art without further explanation. In this regard, a typical conventional motor solenoid drive circuit which separately applies both solenoid pull in and hold in power is illustrated in schematic in FIG. 12 with, again, typical component values and identifications being provided so that this conventional circuit may readily be understood by a person of ordinary skill in the art without further explanation.

Figure 13:
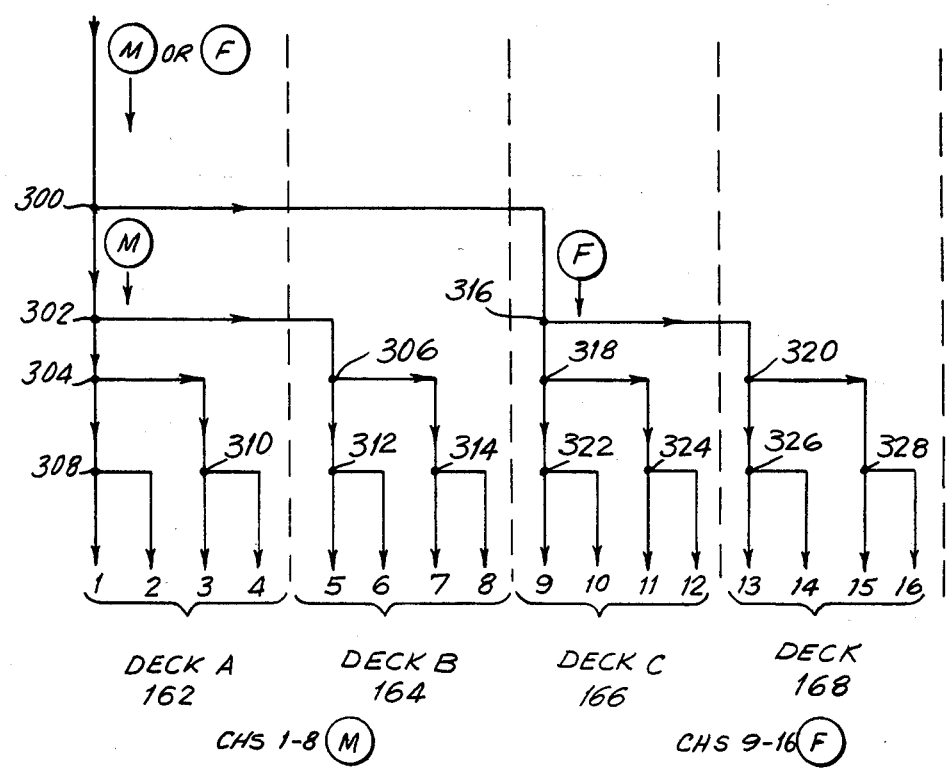
FIG. 13 is a diagrammatic illustration of a typical branching schematic for a typical multiple deck level of the system of FIG. 1.

Referring now to FIG. 13, a typical branching schematic for a typical level, such as level 150 in the system 100 of the present invention is illustrated. In this regard, in FIG. 13 it is assumed that the four decks 162, 164, 166 and 168 are provided so as to provide sixteen channels with four channels being provided per deck. In the example illustrated in FIG. 13 the initial branching breakdown in the interactive response of the caller is between the designation of the caller as a male designated by the letter M or a female designated by the letter F. Additional branching decisions as to age or geographic identity or whatever may also be provided along the way. As shown and preferred in the example of FIG. 13, channels 1 to 8 on decks 162 and 164 will ultimately provide the individualized interactive response for an individual who has initially indicated that he is a male whereas channels 9 through 16 on decks 166 and 168 would provide the individualized interactive response for a caller who has initially indicated that she is a female. As can be seen from FIG. 13, the initial branching decision at point 300 would switch the caller either to channel 1 initially or channel 9 depending on whether the response was male or female. Assuming the response was male the next branching point in FIG. 13 is point 302 and depending on the interactive response that results into other possible branching points at 304 and 306 and, again, depending on the response that ultimately results in four other possible branching points at 308, 310, 312 and 314 to ultimately provide an individualized response for the male caller on any one of channels 1 though 8. Similarly, assuming that at branching point 300 the caller has indicated that she is a female this will result in possible branching decisions at points 316, 318, 320, and ultimately at one of 322, 324, 326 or 328 resulting in an individualized response for the female caller on one of channels 9 through 16 in the example of FIG. 13. Thus, it should be noted that the computer logic or algorithim provides a selection maze for selecting the correct interactive response depending on the individualized selection of the caller which will direct the caller to a particular channel in the system 100. As was previously mentioned, the system 100, by way of example, contains ninety-six channels for selection with sixteen of these channels preferably being interactive and with there being six starts or levels within the system so as to provide one start every twenty seconds, by way of example. In addition, preferably three of the starts are of different length within each stack or deck and three channels are of different length while the caller is waiting to get into the selection maze thus giving a possible start approach every seven seconds. In addition, the trailer on the deck tape can tell the system monitor which maze the caller has gone through, with each channel preferably having its own tone identifier. On playback of the tape from the analog recorder 116 of FIG. 3 a suitable tone decoder connected to a play unit may also provide a rapid means for identifying the path taken through the maze to facilitate order taking in sales applications, the tones having been placed on the analog recorder 116 tape from the stored signal in the multichannel playback units, for example, 162 through 168. The system 100, of course, can be used with a dial system, a Touch-Tone system, a voice recognition system, a sound recognition system, or any other conventional telephonic means for extracting information from two-way telephone lines. Furthermore, voice recognition system can be used in lieu of of Touch-Tone decoders rotary or pulse decoders to sense or detect the customers choice. In addition, other methods of two-way communication can also be adapted for use with the system 100 of the present invention. In any event, the system 100 of the present invention provides parallel processing of interactive calls with the various telephone boards as illustrated in FIG. 1 being connected in parallel to ninety-six channels in the above example to provide a virtually unlimited number of lines to access the interactive information in the system 100. As mentioned previously, to assist in processing caller selections, preferably the caller selections are trichotonized or quartized so that poor signal to noice ratios will not affect interpretation of the customer selection for callers using rotary or touch digital phones. In addition, complete memory in demographics may be provided on each call through the use of the aforementioned analog recorder and computer memory in the system 100.

Figure 14:
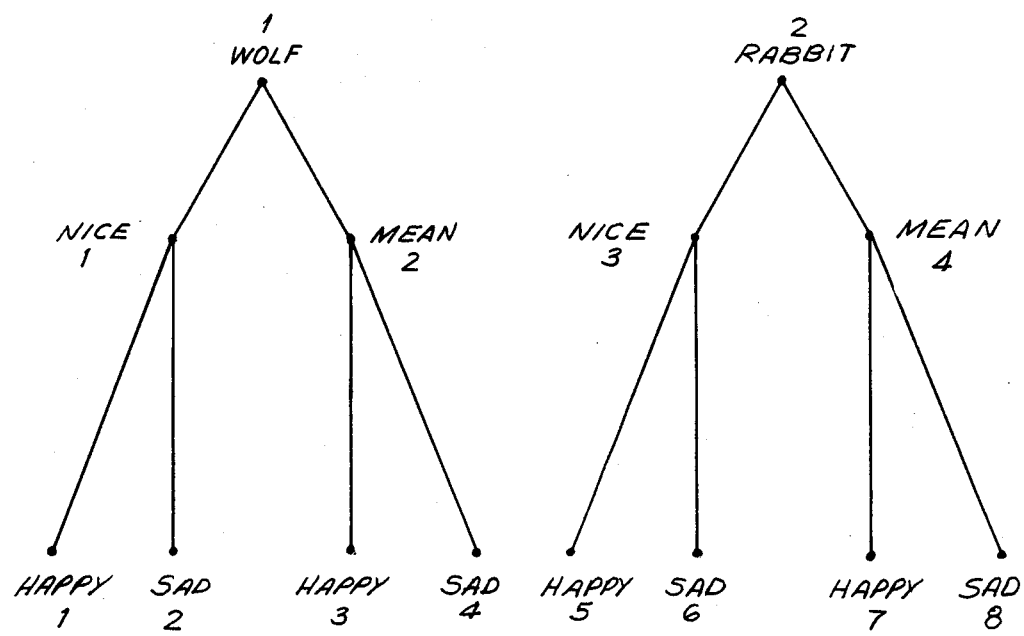
FIG. 14 is a diagrammatic illustration of typical branching diagram with respect to the example of a story.

To illustrate the flexibility of the system 100, an example of eight possible interactive stories which a caller may "create" himself or herself through the use of the system of the present invention is illustrated in FIG. 14. As shown in FIG. 14, and as will be described further in detail below, the story starts off with a choice of a wolf or rabbit. Once the caller has selected which animal is to be in the story the caller then gets to select whether the animal is to be nice or mean and finally whether the story is to have a happy or a sad ending. These various branching points are represented in FIG. 14. The actual information stored on the various channels is illustrated below.

All Channels

Thank you for calling the STORYMAKER LINE. This is the story about a girl named Daffney Jones. Daffney got lost in the woods and met a wolf or rabbit; dial #1 if you want a wolf, or #2 if you want a rabbit.

CH-1

Daffney didn't know it but the wolf turned out to be; dial #1 for nice or #2 for mean.

CH-2

Daffney didn't know it but the rabbit turned out to be; dial #3 for nice or #4 for mean.

Ch 1

If you want this story to have a happy ending, dial #1, a sad ending, dial #2.

Ch 2

If you want this story to have a happy ending, dial #3, a sad ending, dial #4.

Ch 3

If you want this story to have a happy ending, dial #5, a sad ending, dial #6.

Ch 4

If you want this story to have a happy ending, dial #7, a sad ending, dial #8.

An example of the eight different resulting stories depending on the branching choices is given below. The first story, which would result from the above recorded information if the caller selected wolf, nice and happy as the branching choices, is as follows.

Once upon a time there was a pretty little girl named Daffney Jones. Daffney was out taking a walk in the woods one day when she discovered that she was *lost*. Suddenly she met a *wolf* and she decided to ask the wolf directions out of the woods, so she could get home. It turned out to be a lucky thing for Daffney because the wolf was *very nice* and told her how to find her way out of the woods. The wolf said: turn left at the big oak tree and then right at the waterfall, and then go straight, young lady. Daffney followed the directions, and by sundown was home again with her family, and lived *happily ever after.*

The next story, which would result in the same prerecorded information if the caller selected wolf, nice and sad as the branching choices, is as follows.

Once upon a time there was a pretty little girl named Daffney Jones. Daffney was out taking a walk in the woods one day when she discovered that she was *lost*. Suddenly she met a *wolf* and she decided to ask the wolf directions out of the woods, so she could get home. It turned out to be a lucky thing for Daffney that the wolf was very nice and told her which way to go. The wolf said: turn left at the big oak tree and then right at the waterfall, and then straight, young lady. Daffney then thanked the wolf and started towards home, but she could not remember *all* the directions the wolf had given her, so she got lost again, and till this day is lost somewhere, out there, in the woods.

The next story, which would result in the same information if the caller selected wolf, mean and happy as the branching choices, is as follows:

Once upon a time there was a pretty little girl named Daffney Jones. Daffney was out taking a walk in the woods one day when she discovered that she was *lost*. Suddenly she met a *wolf* and she decided to ask the wolf directions out of the woods, so she could get home. Daffney didn't know it but the wolf was *very mean* and *purposely* gave her the *wrong* directions. The wolf said: go right at the big oak tree and then straight past the waterfall. Then make a left at the wooden fence. But Daffney was too smart for the wolf and did not follow these directions. Instead she found her way back the way she *came* and before the sun went down Daffney was out of the woods, home with her family, and lived happily ever after.

The next story, which would result if the caller selected wolf, mean and sad as the branching choices, is as follows.

Once upon a time there was a pretty little girl named Daffney Jones. Daffney was out taking a walk in the woods one day when she discovered that she was *lost*. Suddenly she met a wolf and she decided to ask the wolf directions out of the woods, so she could get home. The wolf said: go right at the big oak tree and then left at the wooden fence and then walk past the waterfall. Daffney didn't know it but the wolf was very mean and purposely gave her the *wrong* directions. Daffney walked around for hours and hours and till this day Daffney is still lost somewhere, out there, in the woods.

The next story, which would result if the caller selected rabbit, nice and happy as the branching choices, is as follows.

Once upon a time there was a pretty little girl named Daffney Jones. Daffney was out taking a walk in the woods one day when she discovered that she was *lost*. Suddenly she met a rabbit and she decided to ask the rabbit directions out of the woods, so she could get home. It turned out to be a very lucky thing for Daffney because the rabbit was very nice and told her how to find her way out of the woods. The rabbit said: turn left at the big oak tree and then right at the waterfall and then go straight ahead for *about* 10 *minutes*, young lady. Daffney followed the directions and by sundown was home again with her family, and lived happily ever after.

The next story, which would result if the caller selected rabbit, nice and sad as the branching choices, is as follows.

Once upon a time there was a pretty little girl named Daffney Jones. Daffney was out taking a walk in the woods one day when she discovered that she was *lost*. Suddenly she met a rabbit and she decided to ask the rabbit directions out of the woods, so she could get home. It turned out to be a very lucky thing for Daffney that the rabbit was very nice and told her which way to go. The rabbit said: turn left at the big oak tree and then right at the waterfall, and then straight ahead. Daffney then thanked the rabbit and started towards home, but she could *not* remember *all* the directions the rabbit had given her, so she got lost again, and till this day is lost somewhere, out there, in the woods.

The next story, which would result from the same information if the caller selected rabbit, mean and happy, is as follows.

Once upon a time there was a pretty little girl named Daffney Jones. Daffney was out taking a walk in the woods one day when she discovered that she was *lost*. Suddenly she met a rabbit and she decided to ask the rabbit directions out of the woods, so she could get home. Daffney didn't know it but the rabbit was *very mean* and purposely gave her the wrong directions. The rabbit said: go right at the big oak tree and then straight past the waterfall. Then make a left at the wooden fence. But Daffney was *too smart* for the rabbit and did not follow these directions. Instead, she found her way back the way she came and before the sun went down Daffney was out of the woods, home with her family, and lived happily ever after.

And lastly, the eighth possible story, which would result in the same information if the caller selected rabbit, mean and sad, is as follows.

Once upon a time there was a pretty little girl named Daffney Jones. Daffney was out taking a walk in the woods one day when she discovered that she was *lost*. Suddenly she met a rabbit and she decided to ask the rabbit directions out of the woods, so she could get home. The rabbit said: go right at the big oak tree and then left at the wooden fence and then walk past the waterfall. Daffney didn't know it but the rabbit was *very mean* and *purposely* gave her the wrong directions. Daffney walked around for hours and hours, and till this day Daffney is still *lost* somewhere, out there, in the woods.

Another example of an eight channel matrix for providing interactive individualized communication with the system 100 of the present invention, and which further illustrates its power and flexibility as a commercial device, is given in the following example in which the caller contacts a company to place an order for a product.

More examples could be given to show how powerful and flexible this system is since the system 100 is responsive at each step of the selection process and the response is specific to the particular desires of the caller. Moreover, as is illustrated in the above example, if a caller was to push an inappropriate button, the system would provide a message to the caller indicating that that had occurred. The only limitation in the system 100 of the present invention appears to be in the number of physical phone lines connected to the system 100 and as long as these lines are increased and appropriate telephone boards are added, the capacity of the system 100 becomes unlimited. Thus, by utlizing the system 100 of the present invention an interactive telephone broadcast system is provided in which information is continuously rebroadcast for interactive selection with the rebroadcast being independent of the caller placing the call although what is heard by that caller is directly dependent on his or her selection.

It should be noted, that as used throughout the specification and claims, the term "dialing code" is meant to include rotary clicks, Touch-Tone type pulse codes, voice recognition signals and any other signal capable of providing a unique selection identification via telephone transmission.

What is claimed is:

1. In a verbally interactive telephone interrogation system comprising a two-way telephone subscriber network including a plurality of telephone caller means and a telephone message routing means operatively connected to said plurality of telephone caller means for selectively connecting individual ones of said plurality of telephone caller means to a remote message transmission means having an associated telephone number in response to provision of a unique dialing code from any of said telephone caller means corresponding to said associated telephone number, each of said telephone caller means comprising telephone reception means for receiving audio messages over said two-way telephone subscriber network and signal generator means for selectively providing the unique signal outputs to be transmitted over said two-way telephone subscriber network, said two-way subscriber network comprising a plurality of incoming telephone lines to said remote transmission message means; the improvement comprising storage means capable of retrievably storing a plurality of parallel retrievable channel sets of interactive audio information, having substantially the same audio information and content duration, said parallel channel sets of retrievable audio information being simultaneously broadcast with each parallel channel set audio information content having a message initiation time and message termination time, each of said channel message set initiation times and termination times being staggered in real time with respect to each other; each of said channel sets comprising a plurality of interactively related channels of audio information responsive to individual interactive selection by a caller connected thereto via said subscriber network;

means responsive to an activation signal for initiating cyclical simultaneous rebroadcast of said staggered parallel channel sets audio information, independent of subsequent caller selection of said information; and means for providing independent interactive parallel processing of multiple subscriber calls to said associated telephone number whereby each caller contacting said associated telephone number may independently interact with said audio information in a given channel set for providing an individualized interactive message over said two-way subscriber network via said subscriber signal generator to said storage means and receive an individualized interactive audio response in response thereto directly dependent on said caller individual selection for providing an individualized interactive communication;

said storage means comprising a message selection maze comprising multiple levels and multiple channels within said level with each level having staggered message initiation times, whereby a plurality of subscribers may engage in substantially simultaneous interactive telephone communication.

2. An improved interactive telephone interrogation system in accordance with claim 1 wherein said storage means further comprises means for retrievably storing interactive selection data provided by said callers during said individualized interactive communciations.

3. An improved interactive telephone interrogation system in accordance with claim 1 wherein said parallel processing means comprises telephone board means operatively connected to said telephone message routing, said telephone board means comprising microprocessing means for selecting the next available interactive audio information message from said plurality of simultaneous rebroadcast parallel channel audio information in response to said unique dialing code.

4. An improved interactive telephone interrogation system in accordance with claim 3 wherein said parallel storage means comprises multitrack tape means.

5. An improved interactive telephone interrogation system in accordance with claim 4 wherein said multitrack tape means comprises a plurality of multitrack tape decks comprising a level in said selection maze, each of said decks comprising a plurality of different channels, said plurality of different channels comprising a channel set.

6. An improved interactive telephone interrogation system in accordance with claim 5 wherein said multitrack tape means further comprises synchrorizing means for insuring that said plurality of tape decks comprising said level start simultaneously.

7. An improved interactive telephone interrogation system in accordance with claim 6 wherein said parallel storage means comprises a plurality of said levels of said multitrack tape means, each of said levels in said selection maze comprising a plurality of said tape decks.

8. An improved interactive telephone interrogation system in accordance with claim 7 wherein said telephone board means further comprises analog multiplexer means operatively connected to said microprocessing means for selecting the next available level and channel in said mesage selection maze in response to said unique dialing code from a telephone caller via said two-way subscriber network.

9. An improved interactive telephone interrogation system in accordance with claim 8 wherein telephone message routing means comprises a plurality of incoming telephone lines and said system further comprises a plurality of said telephone board means, with one of said telephone board means being associated with a given one of said plurality of incoming telephone lines.

10. An improved interactive telephone interrogation system in accordance with claim 9 wherein said telephone board means further comprises touch-tone decoder means responsive to a Touch-Tone dialing code.

11. An improved interactive telephone interrogation system in accordance with claim 10 wherein said Touch-Tone decoder means comprises tone decoder means for each of said channels.

12. An improved interactive telephone interrogation system in accordance with claim 3 wherein said telephone board means further comprises means for trichotonizing signals received over said two-way subscriber network from said caller signal generator into three distinct numbers whereby the plurality of telephone signals provided from a telephone caller Touch-Tone signal generator means over said two-way telephone subscriber network in interactive response to said audio information may be trichotonized.

13. An improved interactive telephone interrogation system in accordance with claim 3 wherein said telephone board means further comprises means for quartizing signals received over said two-way subscriber network from said caller signal generator into four distinct numbers whereby the plurality of telephone signals provided from a telephone caller Touch-Tone signal generator means over said two-way telephone subscriber network in interactive response to said audio information may be quartizing.

14. An improved interactive telephone interrogation system in accordance with claim 3 wherein said telephone board means further comprises analog multiplexer means operatively connected to said microprocessing means for selecting the next available level and channel in said mesage selection maze in response to said unique dialing code from a telephone caller via said two-way subscriber network.

15. An improved interactive telephone interrogation system in accordance with claim 14 wherein telephone message routing means comprises a plurality of incoming telephone lines and said system further comprises a plurality of said telephone board means, with one of said telephone board means being associated with a given one of said plurality of incoming telephone lines.

16. An improved interactive telephone interrogation system in accordance with claim 15 wherein said telephone board means further comprises Touch-Tone decoder means responsive to a Touch-Tone dialing code.

17. An improved interactive telephone interrogation system in accordance with claim 16 wherein said Touch-Tone decoder means comprises tone decoder means for each of said channels.

18. An improved interactive telephone interrogation system in accordance with claim 15 wherein said telephone board means further comprises means for trichotonizing signals received over said two-way subscriber network from said caller signal generator into three distinct numbers whereby the plurality of telephone signals provided from a telephone caller Touch-Tone signal generator means over said two-way telephone subscriber network in interactive response to said audio information may be trichotonized.

19. An improved interactive telephone interrogation system in accordance with claim 15 wherein said telephone board means further comprises means for trichotonizing signals received over said two-way subscriber network from said caller signal generator into three distinct numbers whereby the plurality of telephone signals provided from a telephone caller Touch-Tone signal generator means over said two-way telephone subscriber network in interactive response to said audio information may be trichotonized.

20. An improved interactive telephone interrogation system in accordance with claim 2 wherein said parallel storage means comprises multitrack tape means.

21. An improved interactive telephone interrogation system in accordance with claim 20 wherein said multitrack tape means comprises a plurality cf multitrack tape decks comprising a level in said selection maze, each of said decks comprising a plurality of different channels, said plurality of different channels comprising a channel set.

22. An improved interactive telephone interrogation system in accordance with claim 21 wherein said multitrack tape means further comprises synchronizing means for insuring that said plurality of tape decks comprising said level start simultaneously.

23. An improved interactive telephone interrogation system in accordance with claim 22 wherein said parallel storage means comprises a plurality of said levels of said multitrack tape means, each of said levels in said selection maze comprising of plurality of said tape decks.

24. An improved interactive telephone interrogation system in accordance with claim 1 wherein said parallel storage means comprises multitrack tape means.

25. An improved interactive telephone interrogation system in accordance with claim 24 wherein said multitrack tape means comprises a plurality of multitrack tape decks comprising a level in said selection maze, each of said decks comprising a plurality of different channels, said plurality of different channels comprising a channel set.

26. An improved interactive telephone interrogation system in accordance with claim 25 wherein said multitrack tape means further comprises synchronizing means for insuring that said plurality of tape decks comprising said level start simultaneously.

27. An improved interactive telephone interrogation system in accordance with claim 26 wherein said parallel storage means comprises a plurality of said levels of said multitrack tape means, each of said levels in said selection maze comprising of plurality of said tape decks.

28. An improved interactive telephone interrogation system in accordance with claim 25 wherein said selection maze comprises ninety-six channels and six levels, with sixteen channels per level.

29. An improved interactive telephone interrogation system in accordance with claim 1 wherein said selection maze comprises ninety-six channels and six levels, with sixteen channels per level.

30. An improved interactive telephone interrogation system in accordance with claim 1 wherein said selection maze comprises sixteen channels per level.

31. An improved interactive interrogation system in accordance with claim 1 wherein said parallel processing means comprises means for selecting a given parallel channel set level solely dependent on time of receipt of completed contact of said associated telephone number by a caller.

* * * * *

UNITED STATES PATENT AND TRADEMARK OFFICE
CERTIFICATE OF CORRECTION

PATENT NO. : 4,594,476

DATED : June 10, 1986

INVENTOR(S) : Michael J. Freeman

It is certified that error appears in the above-identified patent and that said Letters Patent is hereby corrected as shown below:

Column 6, line 54: "preferaly" should read --preferably--
Column 15, line 63: "synchrorizing" should read
    --synchronizing--
Column 16, line 8: "mesage" should read --message--
Column 16, line 51: "mesage" should read --message--

Signed and Sealed this

Twenty-fourth Day of February, 1987

Attest:

DONALD J. QUIGG

*Attesting Officer*     *Commissioner of Patents and Trademarks*